Patented July 11, 1950

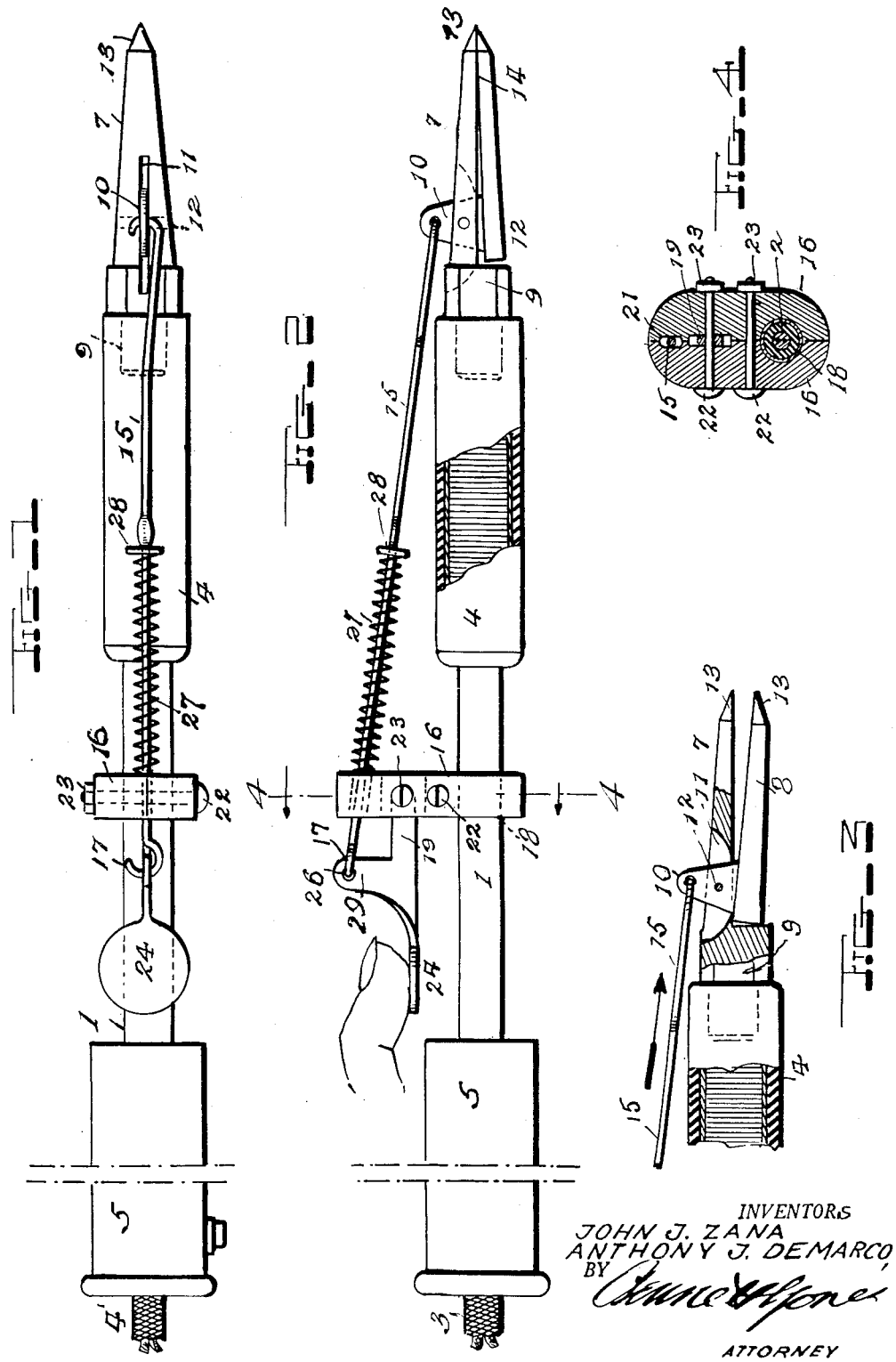

2,514,736

UNITED STATES PATENT OFFICE 2,514,736

SOLDERING IRON

John J. Zana and Anthony J. Demarco, Cleveland, Ohio

Application January 9, 1948, Serial No. 1,417

1 Claim. (Cl. 219—26)

This invention is directed to an improvement in soldering irons, wherein provision is made for gripping a part or parts to be soldered or desoldered, with the control of the gripping elements to be manually governed at will.

The primary object of the present invention is to form the soldering terminals in the form of independent tips, one fixed in position and the other movable through a simple mechanical control to permit the operative ends of the tips to be moved toward each other to serve as a clamp for an article to be soldered or desoldered or to hold soldering material.

The invention is particularly important in permitting the desoldering or separation of parts already soldered, particularly in fine delicate work, as in television sets where the soldering and desoldering of the wires and other delicate parts are of prime importance, to thereby avoid the application of too much heat to the parts being desoldered and their subsequent damage.

The invention is illustrated in the accompanying drawings, in which:

Fig. 1 is a plan view of the improved soldering iron.

Fig. 2 is a side view of the same, partly broken out.

Fig. 3 is a broken view in side elevation, partly in section, with the soldering tips partly spread apart.

Fig. 4 is a sectional view on line 4—4 of Fig. 2.

The improved soldering iron is to be heated electrically in the illustration in the drawing, but obviously may be heated in any desired or conventional manner.

The iron structurally considered includes a rod 1 of appropriate diameter and strength, preferably hollow, as at 2, for the passage of the electrical conducting wires 3, which energize a more or less conventional heating element in the shell 4, surrounding the rod 1 at one end. A handle 5 is secured on the end of the rod opposite the shell, the handle being of wood or other non-heating material.

The soldering element proper is made up of two tips 7 and 8, the former being fixed to a plug 9, while the latter 8 is provided with an ear 10 passing through a slot 11 in the tip 7, and extending beyond the tip 7, as shown in Figs. 1, 2 and 3. The tip 8 is pivotally connected to the tip 7 by pivot 12 passing through the ear 10 and tip 7, the tip 8 being free of connection with the tip 7 other than the pivot 12.

The tips 7 and 8 are elongated and terminally formed at their free ends to provide jointly a pointed end 13 when the tips closed, the meeting faces forming flat gripping surfaces for some distance from the point 13, as at 14, Fig. 2.

In order that the tips of the soldering points may be closed at will to grip a wire or support, as shown in Fig. 3, the ear 10 beyond the tip 7 is connected to one end of an operating rod 15, which rod extends toward the handle 5 through a guide block 16 and beyond the block is formed with a hook 17.

The guide block 16 is made in halves and recessed to embrace the rod 1 at 18; then recessed at 19 to removably receive the end of a finger piece 20 and further recesses at 21 to provide a guide for the rod 15. The guide block 16 is fixed but removably secured to the rod 1 by bolts 22, secured by nuts 23, removal of which bolts permits removal of the guide block at any time desired.

The finger piece which is pivotally supported in the guide block 16 on the upper of the bolts 22 has a finger section 24 in line with the pivoted end 19 and an upstanding ear 29 to an eye 26 of which the hook 17 of the rod is secured. A compression spring 27 surrounds the rod 15, bears at one end against the guide block 16, and at the opposite end against a stop 28 abutting a flat on the rod 15, as shown in Fig. 1.

The soldering iron is of the biggest advantage in that wires to be desoldered can be gripped between the lips of the iron and by the application of heat, the desoldering process can be accomplished with the minimum of effort and application of heat. This function is of great importance because on many occasions, the application of too much heat in desoldering will cause damage to the wires of the unit, which is being worked on. This is particularly advantageous in working on television sets where the temper and hardness of the wires and other metal objects which are to be soldered or desoldered is of prime importance.

In the use of the iron, after the joint has been prepared (if it be a wire joint), the iron is applied so as to grip it between the tips, when both the joint and the iron may be held in the one hand. The joint will then be heated on opposite sides and the solder may be flowed over it with the other hand. When the solder has fully penetrated the joint, the latter may be released, without jarring, merely by releasing the finger piece, when the movable tip will be shifted to release position by the spring 27.

In the desoldering operation, the joint is gripped between the two tips and there held until the solder is melted, the free hand the while rocking one of the wires so that the two will be separated as the solder is being melted.

By reason of having the closing operation of the tips effected manually and the opening operation by the biasing spring, the intensity of the grip may be varied at will and the release accomplished without jarring a finished joint, as might be the case did the opening movement have to be carried out manually.

Having thus described the invention what is claimed as new is:

An electric soldering iron comprising a shank having a shell at one end and a heating element enclosed by the shell, a fixed tip extending axially from the shell, a movable tip complemental to the fixed tip and having an ear extending through a slot in the fixed tip and pivoted therein, a handle at the remote end of the shank, a guide block consisting of complemental sections and bolts connecting the same, the facing sides of the block sections being recessed so as to embrace the shank, a finger piece pivotally mounted on one of said bolts in a recess formed jointly in said sections and having a finger section adjacent said handle, and a rod having terminal pivotal connections with said finger piece and with said ear and passing slidably through said block.

JOHN J. ZANA.
ANTHONY J. DEMARCO.

REFERENCES CITED

The following references are of record in the file of this patent:

UNITED STATES PATENTS

| Number | Name | Date |
|---|---|---|
| 466,520 | Cook et al. | Jan. 5, 1892 |
| 1,332,937 | Van Viersen | Mar. 9, 1920 |
| 1,845,475 | Benson | Feb. 16, 1932 |
| 2,469,877 | Haberman | May 10, 1949 |